United States Patent [19]

Honma

[11] Patent Number: 4,806,815

[45] Date of Patent: Feb. 21, 1989

[54] LINEAR MOTION ACTUATOR UTILIZING EXTENDED SHAPE MEMORY ALLOY MEMBER

[75] Inventor: Dai Honma, Tokyo, Japan

[73] Assignee: Naomitsu Tokieda, Tokyo, Japan

[21] Appl. No.: 42,676

[22] Filed: Apr. 27, 1987

Related U.S. Application Data

[62] Division of Ser. No. 769,465, Aug. 26, 1985, abandoned.

[30] Foreign Application Priority Data

Apr. 3, 1985 [JP] Japan ................................. 60-69079

[51] Int. Cl.⁴ .......................... H02N 7/00; H01H 71/18
[52] U.S. Cl. ..................................... 310/307; 337/140; 361/211
[58] Field of Search ................ 337/140, 393; 310/306, 310/307; 318/116, 117; 361/211

[56] References Cited

U.S. PATENT DOCUMENTS 3,652,969 3/1972 Willson et al. ...................... 337/140
4,544,988 10/1985 Hochstein ............................ 361/211

Primary Examiner—Patrick R. Salce
Assistant Examiner—Judson H. Jones
Attorney, Agent, or Firm—Birch, Stewart, Kolasch & Birch

[57] ABSTRACT

A linear motion actuator which has a body; a member which is movable in a linear direction with respect to the body; an extended member made of shape memory alloy material, extended in a direction transverse to that linear direction so as to intersect it, supported at its ends by the body, and substantially coupled at its intermediate portion to the movable member at least with regard to mutual movement therebetween in that linear direction; and an element for biasing the movable member and the intermediate portion of the extended shape memory alloy member in that linear direction, so as to apply an elongation deformation to the extended shape memory alloy member. This linear motion actuator is inexpensive, compact, and light, and can be operated with a low voltage electrical supply, without being made bulky. Also, this linear motion actuator has an appropriate stroke to force relationship, and can be arranged to have a considerably large stroke. This linear motion actuator is quiet in its operation, and has high power, and further develops this high power at the start of the motion of its actuated member. No substantial problems of uneven heating of the shape memory alloy member occur, because it is linearly extended, and thus it is entirely and definitely subjected to phase transformation, when appropriate. Therefore, in this linear motion actuator, the shape recovering property of the shape memory alloy member is efficiently, effectively, and wholly utilized.

7 Claims, 4 Drawing Sheets

LINEAR MOTION ACTUATOR UTILIZING EXTENDED SHAPE MEMORY ALLOY MEMBER

This application is a divisional of copending application Ser. No. 769,465, filed on Aug. 26, 1985, now abandoned.

BACKGROUND OF THE INVENTION

The present invention relates to the field of linear motion actuators, and in particular, to a linear motion actuator which utilizes the memory effect provided by a shape memory alloy member.

Linear actuators are considered to be devices which, when supplied with electrical power of appropriate voltage and amperage or when operated in some other manner, provide linear motion so as to actuate another device or machine. A solenoid is a well known type of such linear motion actuator.

However, the defects of a solenoid when used as a linear motion actuator include the following:

(a) a solenoid is complicated in its construction, and it is difficult to reduce its cost and size;

(b) a solenoid is not easily designed for being driven with a low voltage electrical power source—typically, a solenoid requires a large and heavy coil;

(c) the stroke to force relationship for a solenoid is very non linear;

(d) it is difficult to design a solenoid to have a long stroke;

(e) in a plunger type solenoid, there is a noise problem because of the movable iron core hitting the fixed iron core, and, although a so called noiseless type solenoid has been developed, it incorporates less iron and thus it has less power;

(f) a solenoid provides low actuating force at the start of the motion of the core thereof, but in fact in many applications the greatest resistance is presented at the start of motion of the member to be actuated; and accordingly the stroke to force relationship for a solenoid is often very unsuited to particular applications.

A type of linear motion actuator that has recently been developed is one incorporating a coil of shape memory alloy wire material. Shape memory alloy has the property that, when a member made of shape memory alloy is supplied with an output of thermal energy and is heated, as for example by the Joule effect which is produced by an electric current passed through the member, the member exerts a force in the direction which will bring its shape nearer to the original shape via a phase transformation (the reversion transformation from the martensite phase to the parent phase), and its shape tends to alter towards an original that it remembers. This force tending towards alteration of the shape of the member can be utilized for driving a driven member in a desired direction, thus performing mechanical work. In the case of a linear motion actuator as described above, the shape memory alloy wire is wound into a coil, and the coil is arranged to remember a shape in which it has a particular length in its longitudinal direction. In the non actuated condition of the actuator, the coil is biased to have a particular different axial length, and then, when the coil is heated by the passage of an electric current through it, it tries to return to the original length, exerting a force in its longitudinal direction.

However, there are several problems with such prior art devices. First, since its shape memory alloy element is required to be taught in such a coiled shape, this involves cost and difficulties in production. Also, with this coil type shape memory actuator, when the coiled shape memory alloy member is heated by an electric current, relatively large temperature gradients are generated in it, and this may result in heat damage to the coil type shape memory member. Further, during actuation by electric current, some parts of the coil type shape memory actuator may in the worst case not be heated to a proper temperature for phase transformation at all. Also, in the case of such prior art coil type shape memory actuators, the shape recovering force which is being used for motion of the actuated member is the force of the restoration of the original shape of the wire of the coil shape which has become twisted by a torsion deformation, and therefore this shape recovering force is not very strong, because in the case of a torsion deformation the amount of deformation of the wire material of the coil spring is maximum only at the surface of the wire, and decreases towards the central portions of the wire. (As is well known in this art, the greater the amount of deformation of the shape memory alloy member, the greater becomes the shape recovering force thereof).

SUMMARY OF THE INVENTION

Accordingly, it is the primary object of the present invention to provide a linear motion actuator which is free from the above identified problems.

It is a further object of the present invention to provide a linear motion actuator which is inexpensive.

It is a further object of the present invention to provide a linear motion actuator which is compact.

It is a further object of the present invention to provide a linear motion actuator which is lightweight.

It is a further object of the present invention to provide a linear motion actuator which can be operated with a low voltage electrical supply, without being thereby made bulky.

It is a further object of the present invention to provide a linear motion actuator which has an appropriate stroke to force relationship.

It is a further object of the present invention to provide a linear motion actuator which has a considerably large stroke.

It is a further object of the present invention to provide a linear motion actuator which is operates with little noise.

It is a further object of the present invention to provide a linear motion actuator which has high power.

It is a yet further object of the present invention to provide a linear motion actuator which develops a high power at the start of the motion of its actuated member.

It is a yet further object of the present invention to provide a linear motion actuator which utilizes a shape memory alloy member for driving an actuated member, in which no problems of uneven heating of said shape memory alloy member occur.

It is a yet further object of the present invention to provide a linear motion actuator which utilizes a shape memory alloy member for driving an actuated member, in which said shape memory alloy member is entirely and definitely subjected to phase transformation, when appropriate.

It is a yet further object of the present invention to provide a linear motion actuator which utilizes a shape memory alloy member for driving an actuated member, in which the shape restoring property of the shape memory alloy member is efficiently, effectively, and wholly utilized.

According to the most general aspect of the present invention, these and other objects are accomplished by providing a linear motion actuator, comprising: (a) a body; (b) a member which is movable in a linear direction with respect to the body; (c) an extended member made of shape memory alloy material, extended in a direction transverse to the linear direction so as to intersect the linear direction, supported at its ends by the body, and substantially coupled at its intermediate portion to the movable member at least with regard to mutual movement therebetween in the linear direction; and (d) a means for biasing the movable member and the intermediate portion of the extended shape memory alloy member in the linear direction, so as to apply an elongation deformation to the extended shape memory alloy member.

According to this structure, when the extended member made of shape memory alloy material is cool, its material is in the martensite phase state, and is stretched, i.e. is extensionally deformed, by the biasing means pulling the movable member as well as the intermediate portion of the extended shape memory alloy member coupled thereto in the linear direction. On the other hand, when the extended member made of shape memory alloy material is heated, as for example by an electric current being passed through it, its material is caused to undergo the reversion transformation from the martensite phase state to the parent phase state, and thereby it undergoes a tendency to revert to its original shape, which should be a shorter shape than its currently extended and stretched shape, exerting a shrinkage force and, against the pull of the biasing means which is overcome, the intermediate portion of the extended member pulls the movable member in the direction opposite to the biasing provided by the biasing means. This movable member may play the part of an output member of an actuator means for moving a mechanical part which is to be actuated. Thus, there is provided a linear motion actuator which is inexpensive, compact, and light, and which can be operated with a low voltage electrical supply, without being thereby made bulky. Further, this linear motion actuator has an appropriate stroke to force relationship, and can be arranged to have a considerably large stroke. This linear motion actuator is quiet in operation, and has high power, and further develops a high power at the start of the motion of its actuated member. Because the shape memory alloy member is extended and may be substantially a straight wire member, no problems of uneven heating of the shape memory alloy member occur, and the shape memory alloy member is entirely and definitely subjected to phase transformation, when appropriate. Thus, in this linear motion actuator, the shape restoring property of the shape memory alloy member is efficiently, effectively, and wholly utilized.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all given purely for the purposes of explanation and exemplification only, and are not intended to be limitative of the scope of the present invention in any way. In the drawings, like parts and spaces and so on are denoted by like reference symbols in the description, spatial terms are to be everywhere understood in terms of the relevant figure; and wherein.

DESCRIPTION OF THE PREFERRED EMBODIMENTS

Figure 1:
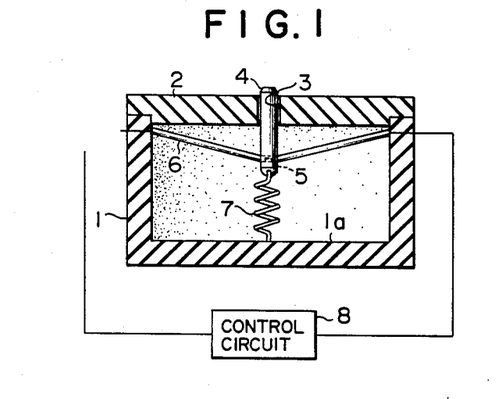
FIG. 1 is a longitudinal cross-sectional view of the first preferred embodiment of the present invention, shown in its state in which it is not being supplied with any actuating electrical energy and a shape alloy wire member thereof is being pulled into a shallow V-shape.

The present invention will now be described with reference to the preferred embodiments thereof, and with reference to the appended drawings. FIG. 1 is a longitudinal cross-sectional view of the first preferred embodiment, shown in its state in which it is not being supplied with any actuating electrical energy. In this figure, the reference numeral 1 denotes the (longitudinally sectioned) body member of a hollow cylindrical box member, which has a bottom 1a and is the main body member of the actuator, and 2 is a lid member fitted on the open end of the body member 1 and has a cylindrical hole 3 formed through its center. Both the body member 1 and the lid member 2 are formed of a substance which is substantially an electrical insulator. A movable rod member 4 is slidably fitted through this cylindrical hole 3 and closely cooperates therewith, with its upper end in the figures protruding outside the actuator, and with its lower end received within the cavity of the body member 1. Near the lower end of the rod member 4 there is pierced a transverse hole 5, and a wire member 6 is passed through this hole 5 with its approximate central portion being held by the hole 5.

This wire member 6 is made of a shape memory alloy (being in fact a Ti-Ni shape memory alloy, 50% Ti-50% Ni in atomic weight, made by Furukawa Denki Kogyo K.K., Tokyo, Japan), and it extends across the inner chamber defined in the body member 1 of the actuator, transversely to the direction of movement of the rod member 4 which is in the longitudinal direction of the body member 1. The ends of this wire member 6 are fixed to points on the inner cylindrical surface of the body member 1 which are substantially diametrically opposed, and the wire member 6 is so configured that it remembers a length L which is equal to or slightly less than the diameter of the inner space of the body member 1; in other words, by being stretched across the inner space of the body member 1, the wire member 6 is thereby kept taut or somewhat in tension. (Although in the shown preferred embodiment of the present invention the original shape of the wire member 6 is a straight line, this is not intended to be limitative of the present invention, and the wire member 6 could alternatively have a different original shape, such as a curved wire shape, because according to the present invention, as will become clear later, only the shape recovering force of the shape memory material wire as contracting from its elongated state is substantially utilized, and the recovering forces from any bent or twisted shape of the wire, due to the thinness of the shape of the wire, are too small to exert any substantial effect in any way). Two lead wires, not particularly shown, are provided for conducting electricity from the outside to the two ends of the wire member 6.

A tension coil spring 7 is connected between the lower end in the figure of the rod member 4, i.e. its inner end, and the approximate center of the bottom 1a of the body member 1. This tension coil spring 7 biases the rod member 4 downward in the drawing, so that, when no electrical power is being applied between the two ends of the wire member 6 and the wire member 6 is thus substantially at ambient temperature and therefore is substantially entirely in the martensite phase, the rod member 4 is in its downwardly displaced position as seen in FIG. 1, with its outer tip portion withdrawn so as to be almost level with the outer surface of the lid member 2. In this condition the wire member 6 is substantially stretched from its original shape, its remembered shape in a tension type deformation condition, and is in fact configured in a shallow V-shape.

Figure 2:
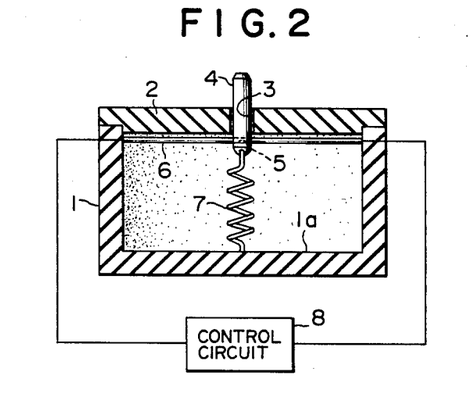
FIG. 2 is a longitudinal cross-sectional view, similar to FIG. 2, showing the first preferred embodiment of the present invention in its state in which it is being supplied with actuating electrical energy and the shape alloy wire member thereof is remembering a shortened shape and is pulling itself taut and substantially straight.

A control circuit 8 is electrically connected across the two ends of the wire member 6, via the aforementioned lead wires not particularly shown, and, when it is desired to actuate the actuator, electrical energy, preferably but not necessarily in a pulsed form, is supplied to the wire member 6, and thereby the wire member 6 is heated. This causes the shape memory alloy material of the wire member 6 to undergo the reversion phase transformation from the martensite phase to the parent phase, and thereby, as is known, the wire member 6 is caused to revert to its original length which is substantially shorter than its elongated length as seen in FIG. 1, exerting a shrinkage force. This generates a substantially increased force in the upwards direction as seen in the figures on the rod member 4. This force raises the rod member 4 to stick its upper end further out from the upper surface of the lid member 2, against the spring force of the tension coil spring 7 which is overcome, so that the wire member 6 is extended substantially as a straight line segment, as shown in FIG. 2. The upper end of the rod member 4 can therefore be used to play the part of an output member of an actuator means for actuating a mechanism by this motion.

On the other hand, when, from the position shown in FIG. 2 in which the wire member 6 is in the heated state and is accordingly substantially in the parent phase condition, the supply of electrical energy from the control circuit 8 is terminated, then the wire member 6 rapidly cools down naturally. This causes the shape memory alloy material of the wire member 6 to undergo the martensitic phase transformation from the parent phase to the martensite phase, and thereby, as known, the wire member 6 is caused to stop trying so hard to revert to its original length. In other words, it loses its shrinkage force, i.e. its shape recovering force, and this causes a substantially decreased force in the upwards direction as seen in the figures to be exerted on the rod member 4. Thereby the spring force of the tension coil spring 7 is now able to pull the rod member 4 downwards in the figures, so as to pull its upper end down towards the upper surface of the lid member 2, against the tension force in the wire member 6, so that the wire member 6 is extended in a shallow V-shape again, as shown in FIG. 1. This reverse motion of the upper end of the rod member 4 can again therefore be used for actuating the aforesaid mechanism.

Figure 3:
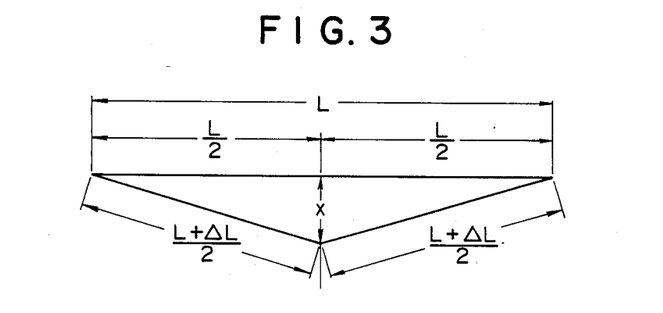
FIG. 3 is a diagram for illustrating the directions and magnitudes of forces in the first preferred embodiment shown in FIGS. 1 and 2.

Referring to the trigonometric diagram of FIG. 3, the relation $$\{(L + \Delta L)/2\}^2 = x^2 + (L/2)^2$$

$$x = \sqrt{L \cdot \Delta L/2}$$

can be easily derived, where L is the original length of the wire member 6 which is here considered to be equal to the diameter of the inner space of the body member 1, and $\Delta L$ is the elongation of the wire member 6. The recovering force produced by the shape memory alloy member 1 can easily be derived from its elongation $\Delta L$, so the relation between the displacement of the rod member 4 of this actuator and the force applied to can be easily derived. Accordingly, the design of this actuator according to the shown first preferred embodiment of the present invention is not difficult.

The construction of this actuator is simple and requires few components and, so therefore the finished product is compact, light, and inexpensive. The displacement to force relationship is akin to a part of a parabola, and so in principle it is more linear than the displacement to force relationship pertaining to a solenoid. This actuator uses only a small current consumption for its operation, and this can be actuated using a low voltage.

Further, according to this first preferred embodiment, the actuator of the present invention has a longer stroke than a solenoid type actuator, which is a great advantage. Further, it produces no noise during operation, without suffering a loss of strength as is suffered by the use of a noiseless solenoid. A particular advantage of the first preferred embodiment of the present invention is that, as a consequence of the aforementioned fact that the recovering force of a shape memory alloy member is higher the greater is its deformation, this actuator provides an actuating force at the start of its motion (when the rod member 4 is most withdrawn as in FIG. 1) which is its highest actuating force.

Comparing this first preferred embodiment of the actuator of the present invention with an actuator of the previously discussed type utilizing a member, made of shape memory alloy, which has remembered a coiled shape, this first preferred embodiment type actuator is less expensive to manufacture, since its shape memory alloy element is not required to be taught any such coiled shape. Also, with such a coil type shape memory actuator, as mentioned previously, when the coiled shape memory alloy member is heated by an electric current relatively large temperature gradients are generated in it, and further during such actuation by electric current some parts of the coil type shape memory actuator may in the worst case be burned out, or, on the contrary, may not get properly heated to a proper temperature for phase transformation at all. By contrast, in the case of the actuator of the present invention, the member formed of shape memory alloy is utilized in a straight shape, and thus few temperature distribution problems occur.

Also, in the case of such a coil type shape memory actuator the force which is being used for the motion of the actuated member is the restoration of the shape of the wire of the coil which has become twisted by a torsion deformation, and this force is relatively weak as in the case of the shown first preferred embodiment of the present invention, in which the force which is being used for motion of the actuated member is the restoration of a tension deformation in the wire member 6 which has been pulled out. This, as previously pointed out, is because in the case of a torsion deformation the amount of deformation of the wire material of the coil spring is at a maximum only at the surface of the wire, and decreases towards the central portions of the wire, whereas on the other hand in the case of a stretching deformation the wire is equally deformed across its entire cross section.

Figure 4:
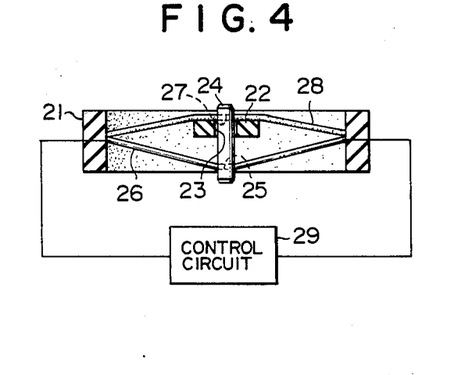
FIG. 4 is similar to FIG. 1 relating to the first preferred embodiment, being a cross-longitudinal sectional view of the second preferred embodiment of the present invention, shown in its state in which it is not being supplied with any actuating electrical energy and a shape alloy wire member thereof is being pulled into a shallow V-shape.
Figure 5:
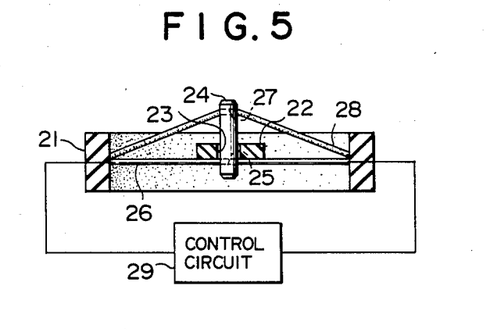
FIG. 5 is a longitudinal sectional view, similar to FIG. 2 relating to the first preferred embodiment, showing the second preferred embodiment of the present invention in its state in which it is being supplied with actuating electrical energy and the shape alloy wire member thereof is remembering a shortened shape and is pulling itself taut and substantially straight.
Figure 6:
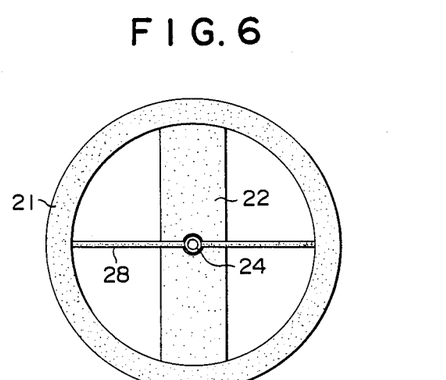
FIG. 6 is a plan view of the aforesaid second preferred embodiment.

In FIGS. 4 through 6, the second preferred embodiment of the linear motion actuator according to the present invention is shown. In FIG. 4, which is a longitudinal cross sectional view of this second preferred embodiment shown in its state in which it is not being supplied with any actuating electrical energy, the reference numeral 21 denotes a longitudinally sectioned hollow cylindrical tube member, which is the main body member of the actuator and in this second preferred embodiment has no lid and no bottom. A transverse bar member 22, best seen in FIG. 6, extends across the central space of the body member 21 near its longitudinal center point, and has a cylindrical hole 23 formed through its center extending in the longitudinal direction of the body member 21. The body member 21 is formed of a substance which is substantially an electrical insulator. A movable rod member 24 is slidably fitted through this cylindrical hole 23 and closely cooperates therewith, with its upper end in the figures protruding outside the actuator. At the upper end in the figures of the rod member 23 there is pierced a transverse hole 27, and at the lower end in the figures of the rod member 23 there is further pierced another transverse hole 25; and a wire member 26 is passed through the hole 25 with its approximate central portion being held by the hole 25, while a restoring elongated rubber thread member 28 is passed through the hole 27 with its approximate central portion being held by the hole 27.

The wire member 26 is made of a shape memory alloy similar to that used in the first preferred embodiment described above, and it extends across the inner space of the cylindrical body member 21 of the actuator, transversely to the direction of movement of the rod member 24 which is in the longitudinal direction of the body member 21. The ends of this wire member 26 are fixed to points on the inner cylindrical surface of the body member 21 which are substantially diametrically opposed, and, as in the first preferred embodiment, the wire member 26 is so configured that it remembers a length which is equal to or slightly less than the diameter of the inner space of of the body member 21; in other words, by being stretched across the inner space of the body member 21, the wire member 26 is thereby kept taut or somewhat in tension. Two lead wires, not particularly shown, are provided for conducting electricity from the outside to the two ends of the wire member 26. Also the rubber thread member 28 extends across the inner space of the body member 21, with its ends fixed to points on the inner cylindrical surface of the body member 21 which are substantially diametrically opposed. The rubber thread member 28 is stretched across the inner space of the body member 21, so as thereby be kept in substantial tension. In this second preferred embodiment, the rubber thread member 28 fulfils the function provided by the tension coil spring 7 in the first preferred embodiment, of biasing the rod member 24 downward in the drawing, so that, when no electrical power is being applied between the two ends of the wire member 26 and the wire member 26 is thus substantially at ambient temperature and therefore is substantially in the martensite phase, the rod member 24 is in its downwardly displaced position as seen in FIG. 4, with its outer tip portion withdrawn so as to be almost level with the upper end in the figure of the body member 21. In this condition the wire member 26 is substantially stretched from its original length in a tension type deformation condition, and is as before configured in a shallow V-shape.

As before, a control circuit 29 is electrically connected across the two ends of the wire member 26, via the aforementioned lead wires not particularly shown, and, when it is desired to actuate the actuator, then electrical energy, preferably but not necessarily in a pulsed form, is supplied to the wire member 26, and thereby the wire member 26 is heated. This causes the shape memory alloy material of the wire member 26 to undergo the reversion phase transformation from the martensite phase to the parent phase, and thereby the wire member 26 tries to revert to its remembered shape in which its length is substantially shorter than its elongated length as seen in FIG. 4, exerting a shrinkage force. This generates a substantially increased force in the upwards direction as seen in the figures on the rod member 24. This force raises the rod member 24 to stick its upper end further out above the upper end of the body member 21 in the figures, against the force of the rubber thread member 28 which is overcome, so that the wire member 26 is extended substantially as a straight line segment, as shown in FIG. 5. The upper end of the rod member 24 can therefore be used to play the part of the output member of an actuator means for actuating a mechanism, by this motion thereof.

On the other hand, when, from the position shown in FIG. 5 in which the wire member 26 is in the heated state and is substantially in the parent phase condition, the supply of electrical energy from the control circuit 29 is terminated, and the wire member 26 rapidly cools down naturally. This causes the shape memory alloy material of the wire member 26 to undergo the martensitic phase transformation from the parent phase to the martensite phase, and thereby the wire member 26 is caused to stop trying to revert to its remembered shape. In other words, it loses the shrinkage force, i.e. the shape recovering force, and this causes a substantially decreased force in the upwards direction as seen in the figures to be exerted on the rod member 24. Thereby the tension force of the rubber thread member 28 is now able to pull the rod member 24 downwards in the figures, so as to pull its upper end down towards the upper end of the body member 21 in the figures, against the tension force in the wire member 26, so that the wire member 26 is extended in a shallow V-shape again, as shown in FIG. 4. This reverse motion of the upper end of the rod member 24 can again therefore be used for actuating the aforesaid mechanism.

Figure 7:
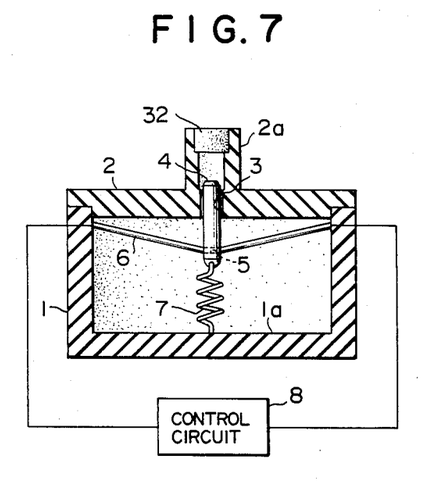
FIG. 7 is similar to FIGS. 1 and 4 relating respectively to the first and second preferred embodiments, being a longitudinal cross-sectional view of the third preferred embodiment of the present invention which includes a permanent magnet, and is shown in its state in which it is not being supplied with any actuating electrical energy and a shape alloy wire member thereof is being pulled into a shallow V-shape.
Figure 8:
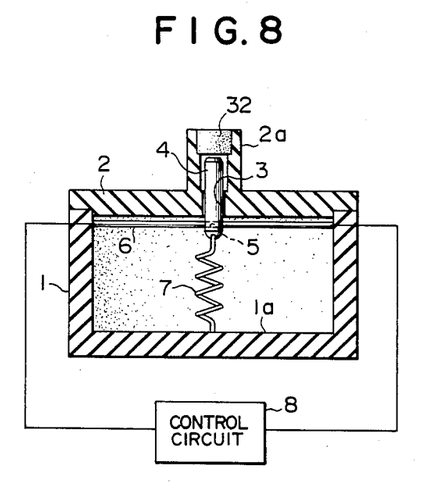
FIG. 8 is similar to FIGS. 2 and 5 relating respectively to the first and second preferred embodiments, showing the third preferred embodiment of the present invention in its state in which it is being supplied with actuating electrical energy and the shape alloy wire member thereof is remembering a shortened shape and is pulling itself taut and substantially straight, so as to contact a rod member against the permanent magnet.

In FIGS. 7 and 8, the third preferred embodiment of the linear motion actuator according to the present invention is shown. This third preferred embodiment is quite similar to the first preferred embodiment, and in these figures, parts which are like parts of the first preferred embodiment shown in FIGS. 1 and 2 are denoted by the same reference numerals. In the first two embodiments shown in FIGS. 1 through 6, the force exerted by the actuator decreased from the starting position, i.e. as the shape memory alloy member got closer to its remembered position; but this third preferred embodiment seeks to avoid such an operational feature. FIG. 7 is a longitudinal cross sectional view of this third preferred embodiment, shown in its state in which it is not being supplied with any actuating electrical energy. The reference numeral 1 denotes the longitudinally sectioned body member of a hollow cylindrical box member, which has a bottom 1a and is the main body member of the actuator, and 2 is a lid member fitted on the open end of the body member 1, which has a cylindrical hole 3 formed through its center and a boss portion 2a extending upwards in the figures around the hole 3. Again, both the body member 1 and the lid member 2 are formed of a substance which is substantially an electrical insulator. A movable rod member 4, made of a magnetically attractable material such as iron, is slidably fitted through the cylindrical hole 3 and closely cooperates therewith, with its upper end in the figures protruding into a cylindrical hole in the boss portion 2a, and with its lower end received within the cavity of the body member 1. Near the lower end of the rod member 4 there is again pierced a transverse hole 5, and as before a wire member 6 is passed through this hole 5 with its approximate central portion being held by the hole 5. As before, this wire member 6 is made of a shape memory alloy of the same type as utilized previously, and it extends across the inner chamber defined in the body member 1 of the actuator transversely to the direction of movement of the rod member 4 with its ends being fixed to points on the inner cylindrical surface of the body member 1 which are substantially diametrically opposed. As before, the wire member 6 is so configured that it remembers a length which is equal to or slightly less than the diameter of the inner space of of the body member 1, so that by being stretched across the inner space of the body member 1 the wire member 6 is thereby kept taut or somewhat in tension. Two lead wires, not particularly shown, are provided for conducting electricity from the outside to the two ends of the wire member 6. As in the first preferred embodiment, a tension coil spring 7 is connected between the lower inner end in the figure of the rod member 4 and the approximate center of the bottom 1a of the body member 1. This tension coil spring 7 biases the rod member 4 downward in the drawing, so that, when no electrical power is being applied between the two ends of the wire member 6 and the wire member 6 is thus substantially at ambient temperature and therefore is substantially in the martensite phase, the rod member 4 is in its downwardly displaced position as seen in FIG. 7, with its outer tip portion withdrawn so as to be almost at the level of the outer surface of the lid member 2, although of course within the aforesaid cylindrical hole in the boss portion 2a. In this condition the wire member 6 is, as before, substantially stretched from its original length in a tension type deformation condition, being configured in a shallow V-shape. At the upper end in the figures of the cylindrical hole in the boss portion 2a, there is fixed a permanent magnet 32 opposing the upper end of the rod member 4.

Again, a control circuit 8 is electrically connected across the two ends of the wire member 6, via the aforementioned lead wires not particularly shown, and, when it is desired to actuate the actuator, then electrical energy, preferably but not necessarily in a pulsed form, is supplied to the wire member 6, and thereby the wire member 6 is heated. This causes the shape memory alloy material of the wire member 6 to undergo the reversion phase transformation from the martensite phase to the parent phase, and thereby, as known, the wire member 6 is tries to revert to its original length which is substantially shorter than its elongated length as seen in FIG. 7, exerting a shrinkage force. This generates a substantially increased force in the upwards direction as seen in the figures on the rod member 4. This force raises the rod member 4 to insert its upper end progressively further into the cylindrical hole in the boss portion 2a, against the spring force of the tension coil spring 7 which is overcome, and, as this action progresses, the force exerted by the wire member 6 on the rod member 4 naturally becomes weaker, because the wire member 6 gets nearer to its original length. However, as the end of the rod member 4 approaches progressively closer to the lower side in the figures of the permanent magnet 32, an increasingly stronger force is exerted in the upwards direction on the rod member 4 by the permanent magnet 32. This ensures that the total upwards force on the rod member 4 does not substantially decrease as the rod member 4 moves upwards, in contradistinction to the case in the first and second preferred embodiments described above. Thus, it is ensured that the rod member 4 can be raised to the limit of its upward travel with a strong force, so that the wire member 6 is extended substantially as a straight line segment, as shown in FIG. 8, and thus, with the magnetic force, this preferred embodiment can compensate for the decrease of the shape recovering force of the shape memory alloy in the process of the alloy reverting to its original length. The rod member 4 can be used for playing the part of an output member of an actuator means for actuating a mechanism by this motion thereof, by being linked thereto by link means not shown in the figures.

On the other hand, when from the position shown in FIG. 8 in which the wire member 6 is in the heated state and is accordingly substantially in the parent phase condition and the wire member 6 has come to be extended substantially as a straight line segment and the upper end in the figures of the rod member 4 has come to contact the lower surface of the permanent magnet 32, the supply of electrical energy from the control circuit 8 is terminated, and then the wire member 6 rapidly cools down naturally. This causes the shape memory alloy material of the wire member 6 to undergo the martensitic phase transformation from the parent phase to the martensite phase, and thereby the wire member 6 is caused to stop trying so hard to revert to its original length. In other words, it loses the shrinkage force, and this causes a substantially decreased force in the upwards direction as seen in the figures to be exerted on the rod member 4.

Thus it will be understood that, with the permanent magnet 32 being arranged to be relatively weak, the tension coil spring 7 will be able to pull the rod member 4 downwards in the figures satisfactory against the attraction exerted by the permanent magnet 32, and thereby the actuator will be able to transit back from its actuated state as shown in FIG. 8 to its non actuated state as shown in FIG. 7, when the supply of electrical energy from the control circuit 8 is stopped. However, as an alternative, if the permanent magnet 32 is arranged to be relatively strong, the tension coil spring 7 will not be be able to pull the rod member 4 downwards in the figures against the attraction exerted by the permanent magnet 32, and thereby the actuator will not be able to transit back from its actuated state as shown in FIG. 8 to its non actuated state as shown in FIG. 7, when the supply of electrical energy from the control circuit 8 is stopped, but the rod member 4 at this time will remain stuck to the lower side of the permanent magnet 32, and sometimes such a feature may be useful.

The above discussed preferred embodiments utilize direct application of heating to the shape memory alloy wire member by passage of a current therethrough, but indirect electrical heating or some other form of heating could be employed, as an alternative.

Figure 9:
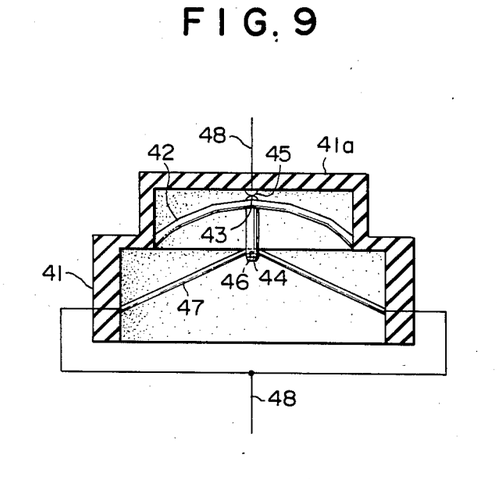
FIG. 9 is similar to FIGS. 1, 4, and 7 relating respectively to the first, second, and third preferred embodiments, being a longitudinal cross-sectional view of the fourth preferred embodiment of the present invention, which is a circuit breaker and is shown in its closed state in which it has not performed interruption of a circuit in which it is installed.
Figure 10:
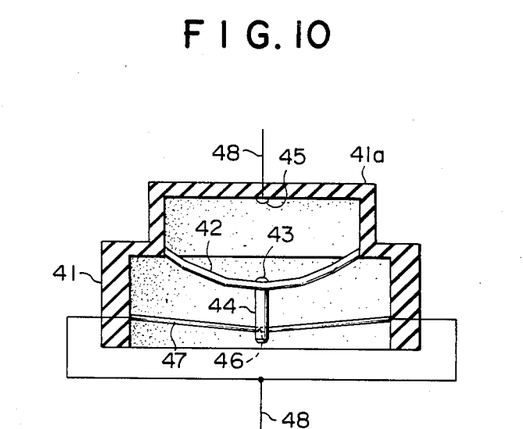
FIG. 10 is similar to FIGS. 2, 5, and 8 relating respectively to the first, second, and third preferred embodiments, showing the fourth preferred embodiment of the present invention in its open state after it has performed interruption of the circuit in which it is thus installed.

In FIGS. 9 and 10, the fourth preferred embodiment of the linear motion actuator according to the present invention is shown. In this fourth preferred embodiment, the present invention is applied to a circuit breaker including a linear motion actuator. FIG. 9 is a longitudinal cross sectional view of this fourth preferred embodiment circuit breaker, shown in its closed state, in which it provides an electrical connection for a circuit (not completely shown, but partially shown and designated by the reference numeral 48) in which it is installed, and in which it has not yet interrupted the circuit 48. The reference numeral 41 denotes the longitudinally sectioned body member of a stepped hollow cylindrical box member, which has a top 41a and a bottom not particularly shown and is the main body member of the circuit breaker. Again, both the body member 41 and its top 41a are formed of a substance which is substantially an electrical insulator. A rod member 44, made of an electrically conducting material such as metal, is provided within the cavity of the body member 41 and is held therein by means to be explained shortly. Near the lower end of the rod member 44 there is again pierced a transverse hole 46, and as before a wire member 47 is passed through this hole 46 with its approximate central portion being held by the hole 46 and being in good electrical contact therewith. This wire member 47 is made of a shape memory alloy of the same type as utilized previously, and it extends across a lower portion in the figures of the inner chamber defined in the body member 41 of the circuit breaker transversely to the direction of movement of the rod member 44 with its ends being fixed to points on the inner cylindrical surface of the body member 41 which are substantially diametrically opposed. As before, the wire member 47 is so configured that it remembers a length which is equal to or slightly less than the diameter of the inner space of of the body member 41, so that by being stretched across the inner space of the body member 41 the wire member 47 is thereby kept taut or somewhat in tension. Two lead wires, not particularly shown, are provided for conducting electricity from the outside to the two ends of the wire member 47.

A spring member 42 is fitted in the upper portion in the figures of the stepped cylindrical body 41 of the circuit breaker, across the body member 41 between points on the inner cylindrical surface of the body member 41 which are substantially diametrically opposed; this spring member 42 is made of a material such as spring steel which provides a high restoring force when bent. The spring member 42 is, in the normal or closed state of the circuit breaker, bent so as to arch upwards in an inverted U-shape as shown in FIG. 9. The upper end in the figures of the rod member 44 is fixed to the central portion of the spring member 42 by a rivet or the like, not particularly shown, so as to define a movable contact member 43 which, when the spring member 42 is upwardly arched as just described, touches against and makes electrical contact with a fixed contact member 45 provided on the inner side of the central portion of the lid portion 41a of the circuit breaker body 41. Thus, in this upwardly arched state, this spring member 42 biases the rod member 44 upward in the drawing, so that, when no electrical power is being applied between the two ends and the middle (as will be explained shortly) of the wire member 47 and the wire member 47 is thus substantially at ambient temperature and therefore is substantially entirely in the martensite phase, the rod member 44 is in its upwardly displaced position as seen in FIG. 9, with its upper tip portion with the contact member 43 thereon in physical and electrical contact with the other contact member 45. In this condition the wire member 47 is, as before, substantially stretched from its original length in a tension type.

A break is made in the electrical circuit 48 to which this circuit breaker is to be fitted, and one side of the break is connected to the two ends of the wire member 47, via the aforementioned lead wires not particularly shown, while the other side of the break is connected, via another lead wire not particularly shown, to the contact member 45. Thus, when the circuit breaker is in the closed state as shown in FIG. 9, all electrical current passing around the circuit 48 is passed therefrom through the contact member 45 to the contact member 43 in contact therewith, through the electrically conducting rod member 44, to the central portion of the wire member 47, and thence outwards along the wire member 47 in opposite directions to the ends of the wire member 47 and thence back to the circuit 48. Thereby the wire member 47 is heated up; but, as long as the current in the circuit 48 is less than a certain determinate trigger value, the amount of heating of the wire member 47 will not be sufficient to cause it to undergo significant reversion phase transformation from the martensite phase to the parent phase, and the circuit breaker will not change its FIG. 9 state, i.e. will stay closed with the spring member 42 holding the contacts 43 and 45 together, and will not trip.

On the other hand, when the current in the circuit 48 becomes greater than the certain determinate trigger value, the amount of heating of the wire member 47 becomes sufficient to cause it to undergo reversion phase transformation from the martensite phase to the parent phase, and thereby, as is known, the wire member 47 tries to revert to its original length which is substantially shorter than its elongated length as seen in FIG. 9, exerting a shrinkage force. This generates a substantially increased force in the downwards direction as seen in the figures on the rod member 44. This force becomes great enough, against the spring force of the spring member 42 which is overcome, to cause the middle portion of the spring member 42 to be bent downwards, and then the spring member 42 snaps downwards to the position thereof shown in FIG. 10, i.e. to a non inverted U-shape, in an over center type action. In this FIG. 10 position, the contact 43 and the contact 45 are no longer touching one another, and thereby the circuit 48 is broken, and no further current can flow therein. Thus, the circuit breaker has tripped and has interrupted the circuit 48, since an excessive current was flowing therein. In this condition, the wire member 47 is extended in an almost straight line segment configuration, as shown in FIG. 10.

Now, since the circuit 48 is thus broken and its current flow is accordingly interrupted, of course no further heating effect is provided for the shape memory alloy wire member 47, and accordingly the wire member 47 rapidly cools down naturally. This causes the shape memory alloy material of the wire member 47 to undergo the martensite phase transformation from the parent phase to the martensite phase, and thereby the wire member 47 is caused to stop trying so hard to revert to its original length. In other words, it loses the shrinkage force, and this causes a substantially decreased force in the upwards direction as seen in the figures to be exerted thereby on the rod member 44. However, because of the above described over center snap action provided by the spring member 42, the rod member 44 does not move upwards in the figures at this time, and the circuit 48 is not reestablished. Accordingly the circuit breaker stays in the open condition. This will continue to be the case until the rod member 43 and the wire member 47 and the spring member 42 are pushed in the upward direction in the figures by a relatively strong force, as for example manually by the hand of an operator.

Now, in the case of the circuit breaker according to the fourth preferred embodiment of the present invention, the electrical flow in the shape memory alloy wire member 47 was between its middle and its two ends, but this need not always be the case; in another embodiment the circuit arrangement could be different, so that the current flow could be between the two ends of the wire member 47. In such a case, some different arrangements would be required to be made relating to the contact members 43 and 45, and such arrangements will be easily conceived of by one of ordinary skill in the relevant art, based upon the disclosures herein.

Further, in all the above embodiments the center of the shape memory alloy wire member was not actually fixed to the hole in the lower end of the movable rod member through which the wire member was passed, but as an alternative this fixing could be performed. Also, the use of Ti-Ni shape memory alloy for the wire member is not mandatory, and possible alloys could be used. Yet further, other biasing means for the rod member other than a torsion coil spring as in the first and second preferred embodiments, a rubber thread member as in the third preferred embodiment, and a leaf spring member as in the fourth preferred embodiment, could be utilized; for instance, a weight could be used for this biasing purpose.

Thus, it is seen that according to the present invention there is provided a linear motion actuator which is cheap, compact, and light, and which can be operated with a low voltage electrical supply, without being thereby made bulky. Further, this linear motion actuator has an appropriate stroke to force relationship, and can be arranged to have a considerably large stroke. This linear motion actuator is quiet in operation, and has high power, and further develops a high power at the start of the motion of its actuated member. As explained above, no substantial problems of uneven heating of the shape memory alloy wire member occur, and the shape memory alloy wire member is entirely and definitely subjected to phase transformation, when appropriate. Thus, in this linear motion actuator, the shape restoring property of the shape memory alloy wire member is efficiently, effectively, and wholly utilized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A linear motion actuator, comprising:
   (a) a body;
   (b) a member which is movable in a linear direction with respect to said body;
   (c) an element made of shape memory alloy material, extended in a direction transverse to said linear direction so as to intersect said linear direction, attached to said body at its ends, and coupled substantially at its intermediate portion to said movable member, for remembering a length in said transverse direction less than or equal to the distance in said transverse direction between its fixed ends, so that upon being heated said extended shape memory alloy element tends to revert to said length to form a substantially straight line;
   (d) a linear elastic means for biasing said movable member and said intermediate portion of said extended shape memory alloy element in said linear direction so as to apply an elongation deformation to said extended shape memory alloy element; and
   (e) a transverse bar member extending across a central space of said body and having a hole formed therein extending in the longitudinal direction of said body for permitting said movable member to be fitted therethrough.

2. The linear motion actuator according to claim 1, further comprising a means for supplying electric current to flow through said extended shape memory alloy element.

3. The linear motion actuator according to claim 1, wherein said elastic means is stretched, and has a natural length in said transverse direction less than or equal to the distance in said transverse direction between its ends.

4. The linear motion actuator according to claim 1, wherein said movable member includes, at one end thereof, a first hole for permitting said shape memory alloy member to be passed therethrough.

5. The linear motion actuator according to claim 4, wherein said movable member includes, at another end thereof, a second hole for permitting said elastic means to be passed therethrough.

6. A linear motion actuator, comprising:
   (a) a body;
   (b) a member which is movable in a linear direction with respect to said body;
   (c) an element made of shape memory alloy material, extended in a direction transverse to said linear direction so as to intersect said linear direction, attached to said body at its ends, and coupled substantially at its intermediate portion to said movable member, for remembering a length in said transverse direction less than or equal to the distance in said transverse direction between its fixed ends, so that upon being heated said extended shape memory alloy element tends to revert to said length to form a substantially straight line;
   (d) means, having snap over center action, for biasing said movable member and said intermediate portion of said extended shape memory alloy element in said linear direction, so as to apply an elongation deformation to said extended shape memory alloy element;
   (e) a pair of contacts, one of which is connected to said movable member, for being closed together when said movable member is positioned in the direction of said biasing provided by said biasing means, and for being apart when said movable member is positioned in a direction opposite to said biasing provided by said biasing means; and
   (f) means for supplying electric current to flow through said extended shape memory alloy member, said supplying being interrupted when said pair of contacts are apart, and occurring when said pair of contacts are closed together, wherein said electric current being supplied flows through said pair of contacts to said movable member, through said movable member to said intermediate portion of said extended shape memory alloy element substantially coupled to said movable member, and to said ends of said extended shape memory alloy element connected to said body.

7. The linear motion actuator according to claim 6, wherein said biasing means is a curved spring member.

* * * * *